(12) United States Patent
Gutschner

(10) Patent No.: US 6,178,845 B1
(45) Date of Patent: Jan. 30, 2001

(54) BOWDEN CABLE FOR TRANSMITTING TENSILE FORCES

(75) Inventor: Andreas Gutschner, Markgroeningen (DE)

(73) Assignee: Ing. h.c.F. Porsche AG, Weissach (DE)

( * ) Notice: Under 35 U.S.C. 154(b), the term of this patent shall be extended for 0 days.

(21) Appl. No.: 09/266,899

(22) Filed: Mar. 12, 1999

(30) Foreign Application Priority Data

Mar. 12, 1998 (DE) .............................................. 198 10 665

(51) Int. Cl.[7] ...................................................... F16C 1/12
(52) U.S. Cl. ..................................... 74/502.4; 74/501.5 R
(58) Field of Search ............................. 74/502.4, 502.6, 74/501.5 R, 500.5

(56) References Cited

U.S. PATENT DOCUMENTS

| | | |
|---|---|---|
| 4,635,498 | 1/1987 | Zimmermann et al. . |
| 4,685,350 * | 8/1987 | Bauer et al. .......................... 74/502.4 |
| 5,280,733 * | 1/1994 | Reasoner .......................... 74/502.6 X |
| 5,531,489 * | 7/1996 | Cetnar ............................... 74/502.4 X |
| 5,579,662 * | 12/1996 | Reasoner .......................... 74/502.6 X |
| 5,596,908 | 1/1997 | Hall . |
| 5,615,584 * | 4/1997 | Irish ..................................... 74/502.6 |
| 5,953,963 * | 9/1999 | Wirsing et al. ...................... 74/502.4 |

FOREIGN PATENT DOCUMENTS

| | | |
|---|---|---|
| 3441716 A1 | 5/1986 | (DE) . |
| 4026914 A1 | 2/1992 | (DE) . |
| 297 05 650 U1 | 7/1997 | (DE) . |
| 0 433 245 A2 | 6/1991 | (EP) . |
| 2 730 772 | 8/1996 | (FR) . |
| 61-266814 | 11/1986 | (JP) . |

OTHER PUBLICATIONS

Translation of Office Action dated Nov. 17, 1998 from German Patent Office in connection with German Appln. No. 198 10 665.3.
Abstract of JP 61–266814, Nov. 26, 1986, Patent Abstracts of Japan, vol. 11, No. 125, M–582, Apr. 18, 1987.

* cited by examiner

*Primary Examiner*—Mary Ann Green
(74) *Attorney, Agent, or Firm*—Evenson, McKeown, Edwards & Lenahan, P.L.L.C.

(57) ABSTRACT

A Bowden cable for transmitting tensile forces is composed of an exterior flexible Bowden cable casing and an interior pulling element guided in sections within the Bowden cable casing. At least one end of the Bowden cable casing is fastened in the longitudinal direction on a receiving device of a stationary holding member. The Bowden cable casing can be mounted on and demounted from the receiving device with low force expenditures and in a simple and rapid manner. The casing is also securely fixed in the fastening position. An injection-molded-on end piece is provided on the end of the Bowden cable casing to be fastened. This end piece can be pushed into a receiving device of the holding member extending approximately parallel to the longitudinal direction of the Bowden cable casing and is fixed in the axial direction in this receiving device by at least one resilient supporting arm constructed on the end piece.

4 Claims, 5 Drawing Sheets

BOWDEN CABLE FOR TRANSMITTING TENSILE FORCES

This application claims the priority of German patent application No. 198 10 665.3, filed Mar. 12, 1998, the disclosure of which is expressly incorporated by reference herein.

BACKGROUND AND SUMMARY OF THE INVENTION

The present invention relates to a Bowden cable for transmitting tensile forces which is composed of an exterior flexible Bowden cable casing and of an interior pulling element guided in sections in the Bowden cable casing. At least one end of the Bowden cable casing is fastened to a receiving device of a stationary holding member in the longitudinal direction.

In an arrangement with Bowden cables for transmitting tensile forces used, for example, in connection with the interior door operating system of the Porsche Boxster, a metal sleeve provided with a radially projecting collar is pressed onto and fastened to an end of the Bowden cable casing or sleeve and the collar is fitted in sections into a corresponding slot of a receiving device arranged on a support part of the interior door operating system. Adjacent to the slot, two spaced snap tongues are molded to the support part, and the Bowden cable casing can be pressed into the snap tongues by displacing movement transversely to the longitudinal direction of the Bowden cable casing. Relatively high manual force expenditures are required for snapping-in the Bowden cable casing. Furthermore, this Bowden cable arrangement does not assure that the end of the Bowden cable will remain in the fastening position.

It is one object of the invention to further develop an end-side fastening of a Bowden cable casing on a stationary holding member such that simple and fast mounting and demounting of the Bowden cable casing on the receiving device are ensured with low force expenditures and without requiring an auxiliary tool, and so that the Bowden cable casing is securely held in the fastening position.

According to the invention, this object is achieved by providing an injection-molded-on end piece on the end of the Bowden cable casing to be fastened. The end piece can be pushed into a receiving device of the holding member which extends approximately parallel to the longitudinal direction of the Bowden cable casing. The end piece is fixed in the receiving device, in the axial direction, by at least one resilient supporting arm constructed on the end piece. Additional characteristics and advantageous developments of the invention are also reflected in the claims.

The principal advantages achieved by the invention are that an end piece, injection-molded onto the end of the Bowden cable casing to be fastened, can be connected with the receiving device in a simple manner by way of a plug-in connection aligned in the longitudinal direction of the Bowden cable casing, and that, in the completely pushed-in fastening position, an additional axial fixing with respect to detachment takes place by molded-on supporting arms. The supporting arms can be swivelled into a release position for demounting the connection. The injection-molded-on end piece and the corresponding receiving device can be produced in a simple manner and at a reasonable cost. As soon as the guide grooves at the end piece contact the holding webs of the receiving device, the Bowden cable casing, when the operating handle is swivelled, is automatically pulled into the fastening position (a secure end position).

BRIEF DESCRIPTION OF THE DRAWINGS

In the following, the invention will be explained in detail with reference to an embodiment illustrated in the drawing figures.

DESCRIPTION OF THE PREFERRED EMBODIMENT

Figure 1:
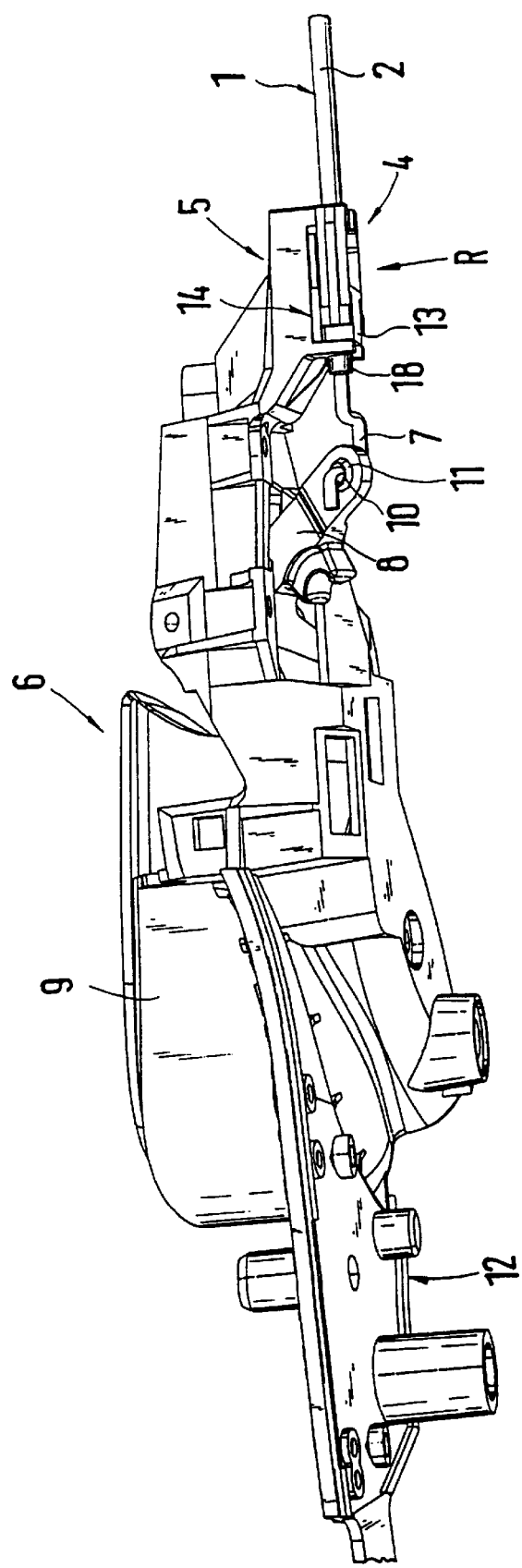
FIG. 1 is a perspective view of an interior door operating system of a motor vehicle with a Bowden cable connected to the operating handle.

A Bowden cable 1 for transmitting tensile forces is composed of an exterior flexible Bowden cable casing 2 and an interior pulling element 3 guided in the Bowden cable casing 2. At least one end 4 of the Bowden cable casing 2 is axially fastened to a stationary holding member 5. The pulling element 3 is formed, for example, by a wire cable which projects on both sides beyond the Bowden cable casing 2.

In the embodiment shown, the Bowden cable 1 is assigned to an interior door operating system 6 on a motor vehicle. One end of the pulling element 3 is connected, in a manner which is not shown in detail, with a door lock. The other end of the pulling element 3 has an end-side hook 7 which can be connected with a swivel arm 8 of an operating handle 9. The hook 7, which is profiled approximately in a Z-shape, is inserted into an opening 10 of the swivel arm 8. A nozzle or grommet 11, made of plastic, is connected between the hook 7 and the opening 10. The operating handle 9 is swivellably disposed on a support part 12 which, in the illustrated embodiment, is fastened to an interior door covering not shown in detail.

According to the invention, an end piece 13 connected with the Bowden cable casing 2 is provided at the fastened end 4 of the Bowden cable casing 2. The end piece 13 can be pushed into a receiving device 14 of the holding member 5 which is aligned approximately in parallel to the longitudinal direction A—A of the Bowden cable casing 2. In the fully pushed-in fastening position B, the end piece 13 is fixed in the axial direction by at least one elastic supporting arm 15 supported on the receiving device 14. The end piece 13 is injection-molded on the outside to the free end of the Bowden cable casing 2. However, the end piece 13 may also be formed by a separate injection-molded plastic part which is connected with the Bowden cable casing 2 by gluing or the like.

Figure 2:
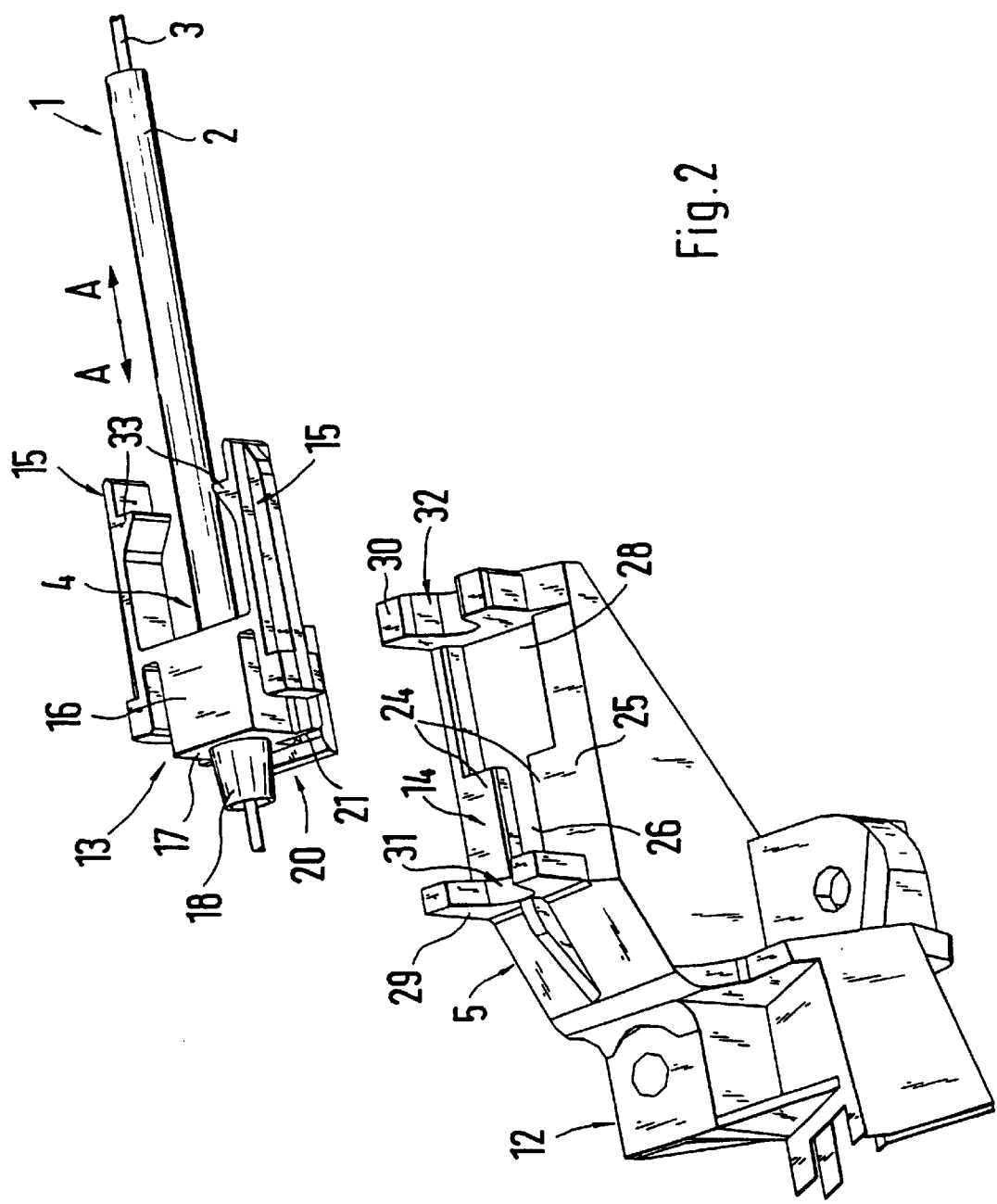
FIG. 2 is a perspective view, in the direction of the arrow R of FIG. 1, of the end of the Bowden cable casing to be fastened and of the holding member on the support plate of the interior door operating system when the Bowden cable is not mounted.
Figure 3:
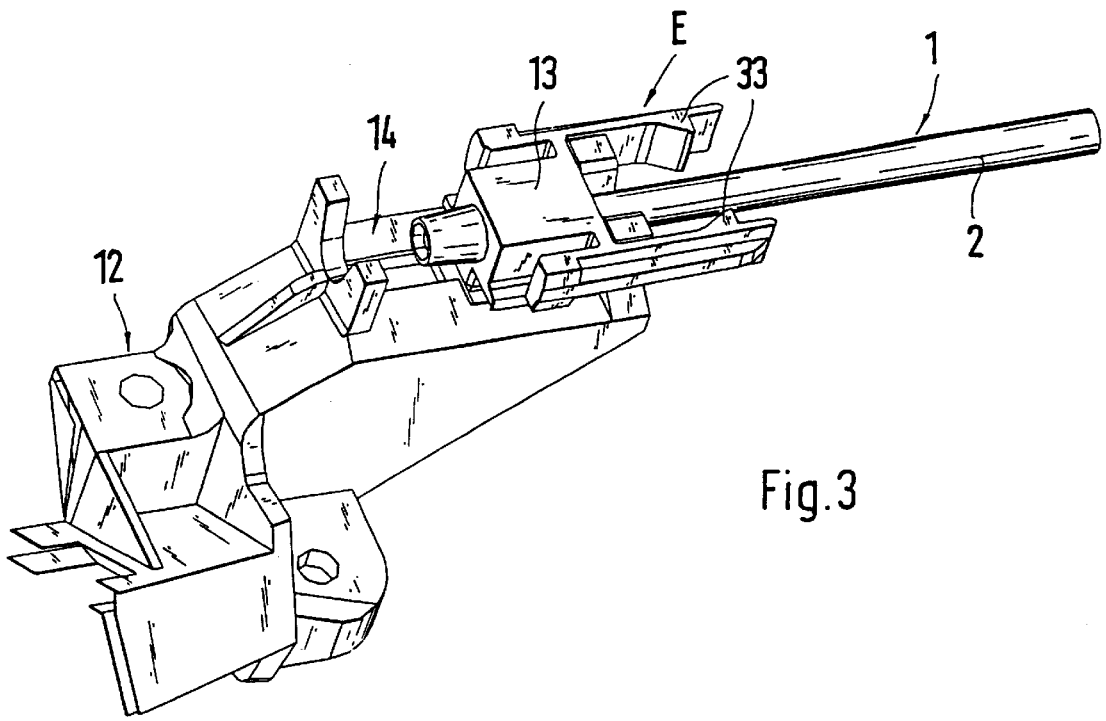
FIG. 3 is a view similar to FIG. 2 but showing the inserting position of the end of the Bowden cable casing to be fastened.
Figure 4:
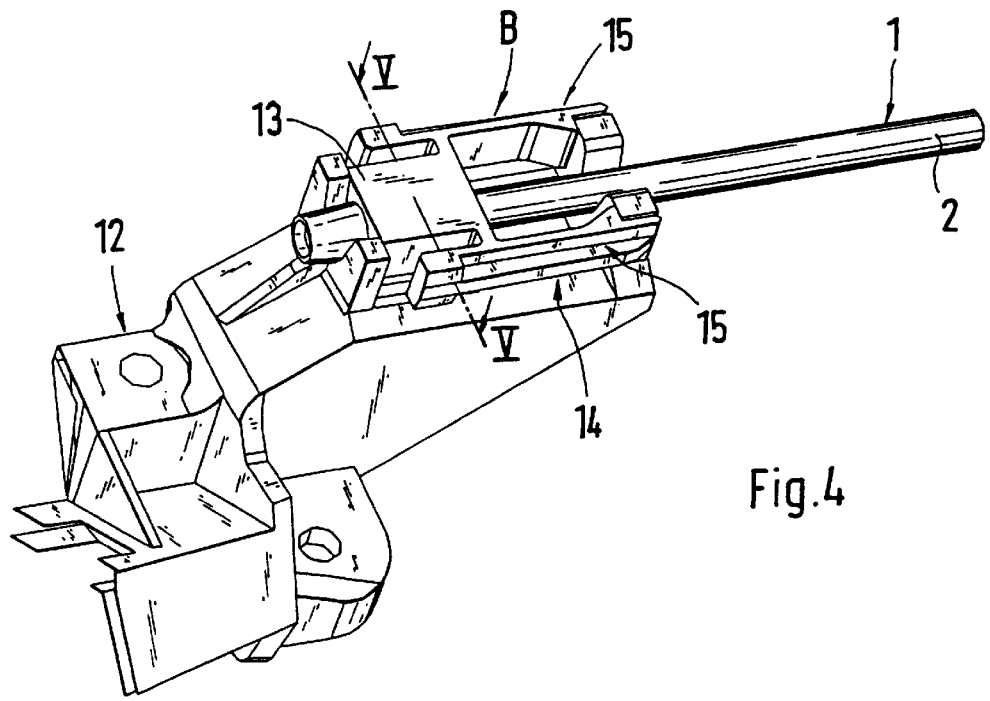
FIG. 4 is a view similar to FIG. 3 but showing the fastening position of the Bowden cable casing.
Figure 5:
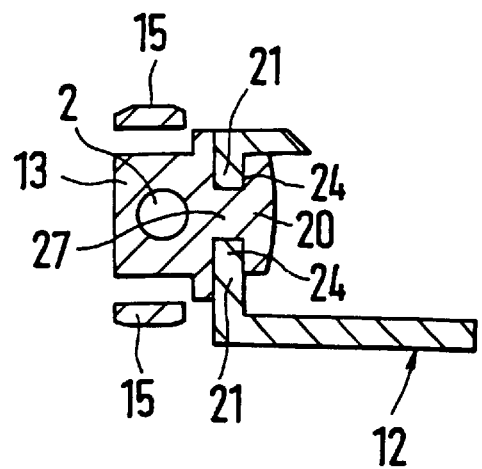
FIG. 5 is a sectional view along line V—V of FIG. 4.
Figure 6:
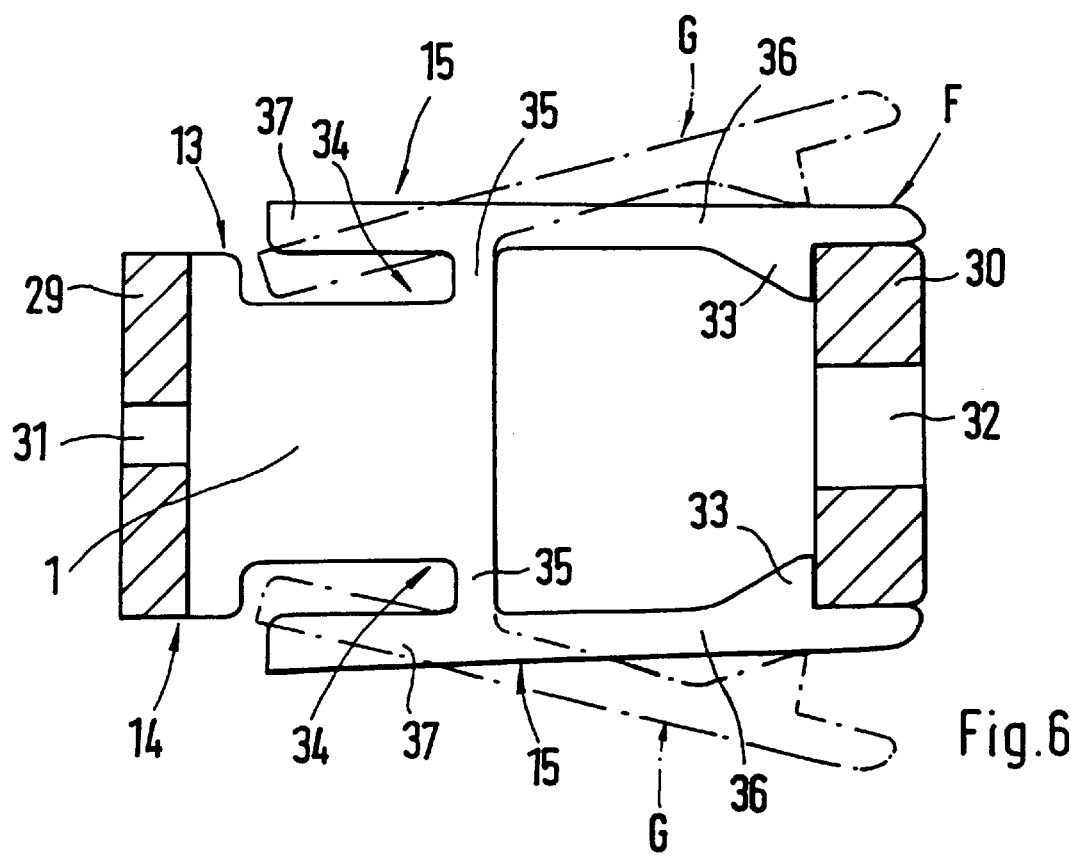
FIG. 6 is a top view of FIG. 4 showing the fastening position of the end piece of the Bowden cable casing.
Figure 7:
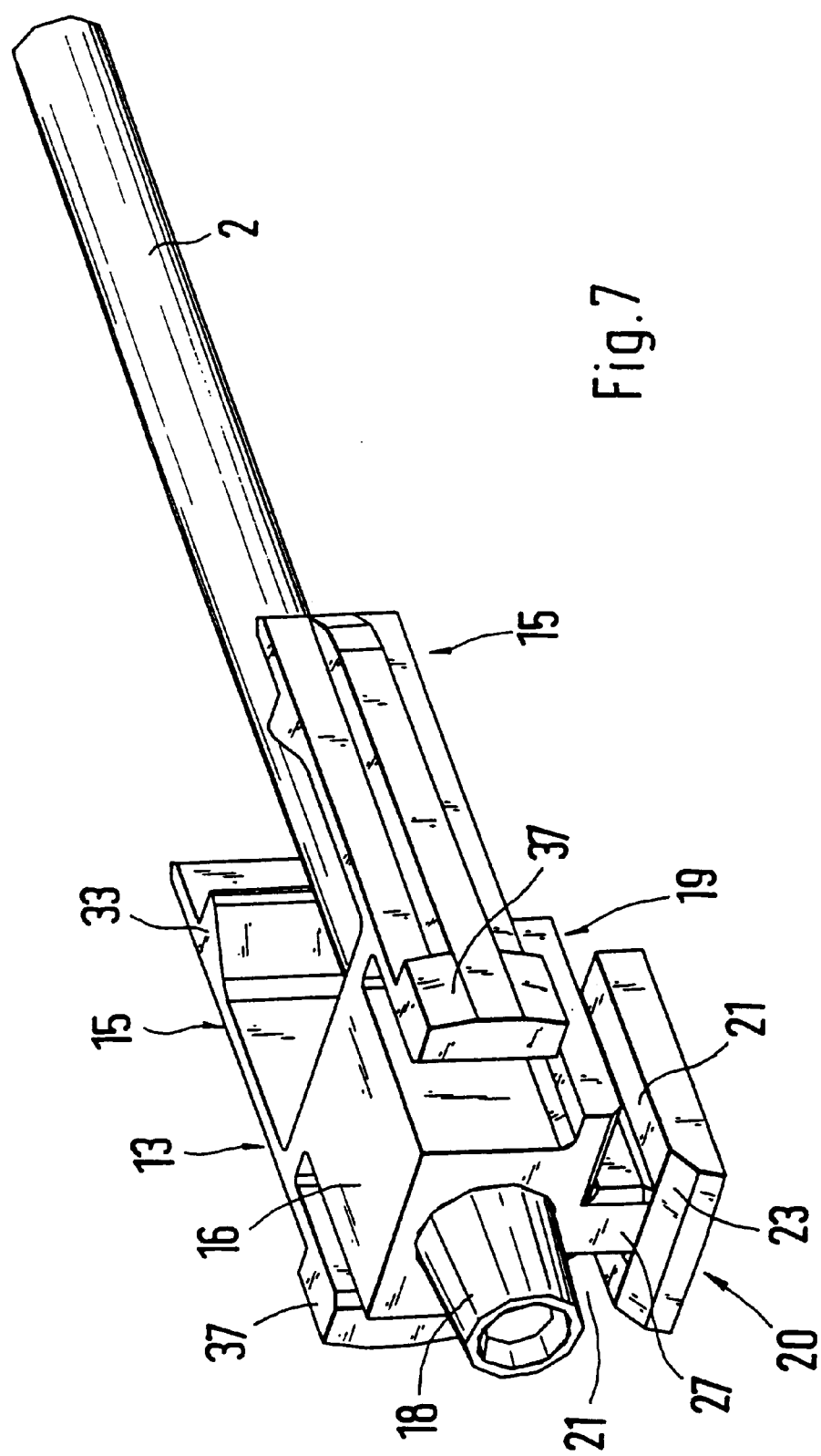
FIG. 7 is a perspective view of the end piece of the Bowden cable casing to be fastened together with the end piece.

According to FIG. 2, the end piece 13 comprises a prismatic basic body 16 which receives the Bowden cable casing 2 approximately in the center and which, on the face side 17 facing the hook 7, has a short projecting hollow connection piece 18 through which the pulling element 3 is guided. A profiled foot section 20, which extends in the longitudinal direction of the Bowden cable casing 2, extends away from a bottom wall 19 of the basic body 16. The foot section 20, in the illustrated embodiment, has an approximately T-shaped profile. The T-shaped foot section 20 and the spaced bottom wall 19 form two opposite guide grooves 21 with approximately U-shaped profiles. The flange of the T-shaped foot section 20, which extends in parallel to the bottom wall 19, projects slightly beyond the face side 17 with its end situated in the slide-in direction and has an inserting slope 23. The holding member 5 is constructed in the embodiment in one piece with the support part 12 of the interior door operating system 6, in which case the receiving device 14 provided at the holding member 5 comprises two spaced holding webs 24 onto which the guide grooves 21 of the end piece 13 can be pushed.

The holding webs 24 are constructed in one piece with a plane wall section 25 of the support part 12. A recess 26 is provided between the spaced holding webs 24, the clear opening of the recess 26 being slightly larger than the thickness of the connection web 27 of the T-shaped outer section 20 to be guided through.

The longitudinal dimensions of the holding webs 24 and the guide grooves 21 are approximately the same. The guide grooves 21 extend along the whole length of the prismatic basic body 16. An approximately rectangular insertion opening 28 is disposed in front of the two holding webs 24, through which insertion opening 28 the foot section 20 of the prismatic body 16 can be inserted into the receiving device 14 and guide grooves 21 can be pushed onto the holding webs 24 (see inserting position E). The receiving device 14 also comprises two spaced transverse webs 29, 30 which are aligned approximately at a right angle with respect to the wall section 25. Each transverse web 29, 30 has an approximately central slot opening 31, 32 which is open on one side. The Bowden pull casing 2 or the connection piece 18 is guided through the slot openings 31, 32.

The transverse web 29 which is situated closer to the swivel arm 8 adjoins the forward end of the two holding webs 24, whereas the other, more rearward transverse web 30 coincides with the rearward end of the insertion opening 28. For axially securing the end piece 13 in the fastening position B, preferably two spaced resilient supporting arms 15 are constructed on the end piece 13. In the fastening position B, the arms are supported by inwardly directed detent noses 33 in a form-locking manner on the interior side of the transverse webs 30. The two supporting arms 15 are guided away on both longitudinal sides 34 of the prismatic basic body 16 from short transversely extending webs 35 and extend parallel to the longitudinal direction of the Bowden cable casing 2. Each supporting arm 15 comprises a first elongated arm section 36 which projects beyond the basic body 16 in the longitudinal direction and on which locally inwardly directed detent noses 33 are constructed.

The first arm section 36 is connected in one piece with a second short arm section 37 which extends in parallel and at a slight distance with respect to the longitudinal side 34 of the prismatic basic body 16. By the admission of pressure to the inside onto the two short arm sections 37, the first arm sections 36 are swivelled from an operative position F to the outside into a release position G.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Bowden cable for transmitting tensile forces comprising:

an exterior flexible Bowden cable casing, an interior pulling element guided in sections in the Bowden cable casing, at least one end of the Bowden cable casing being fastened to a receiving device of a stationary holding member in a longitudinal direction, an injection-molded-on end piece provided on the end of the Bowden cable casing and which can be pushed into the receiving device of the holding member which extends approximately parallel to the longitudinal direction of the Bowden cable casing, and at least one resilient supporting arm constructed on the end piece by which the end piece is fixed, in an axial direction, in the receiving device, wherein said at least one resilient supporting arm includes respective resilient supporting arms, wherein the end end piece comprises an approximately prismatic basic body which surrounds the Bowden cable casing, a profiled foot section extending away from a bottom wall of the basic body, and said respective resilient supporting arms, which extend away from opposite side walls of the basic body, wherein each of said resilient supporting arms comprises a first arm section which projects beyond the basic body in the longitudinal direction and on which locally a molded-on detent nose is provided, and wherein the first arm section is connected in one piece with a second arm section, the supporting arms being swivelled into their release positions by pressing the second arm sections together.

2. Bowden cable for transmitting tensile forces comprising:

an exterior flexible Bowden cable casing, an interior pulling element guided in sections in the Bowden cable casing, at least one end of the Bowden cable casing being fastened to a receiving device of a stationary holding member in a longitudinal direction, an injection-molded-on end piece provided on the end of the Bowden cable casing and which can be pushed into the receiving device of the holding member which extends approximately parallel to the longitudinal direction of the Bowden cable casing, and at least one resilient supporting arm constructed on the end piece by which the end piece is fixed, in an axial direction, in the receiving device, wherein said at least one resilient supporting arm includes respective resilient supporting arms, wherein the end piece comprises an approximately prismatic basic body which surrounds the Bowden cable casing, a profiled foot section extending away from a bottom wall of the basic body, and said respective resilient supporting arms, which extend away from opposite side walls of the basic body, wherein the foot section is profiled approximately in a T-shape and the foot section and the bottom wall situated above it form two opposite guide grooves with approximately U-shaped profiles, wherein each of said resilient supporting arms comprises a first arm section which projects beyond the basic body in the longitudinal direction and on which locally a molded-on detent nose is provided, and wherein the first arm section is connected in one piece with a second arm section, the supporting arms being swivelled into their release positions by pressing the second arm sections together.

3. Bowden cable for transmitting tensile forces comprising:

an exterior flexible Bowden cable casing, an interior pulling element guided in sections in the Bowden cable casing, at least one end of the Bowden cable casing being fastened to a receiving device of a stationary holding member in a longitudinal direction, an injection-molded-on end piece provided on the end of the Bowden cable casing and which can be pushed into the receiving device of the holding member which extends approximately parallel to the longitudinal direction of the Bowden cable casing, and at least one resilient supporting arm constructed on the end piece by which the end piece is fixed, in an axial direction, in the receiving device, wherein said at least one resilient supporting arm includes respective resilient supporting arms, wherein the end piece comprises an approximately prismatic basic body which surrounds the Bowden cable casing, a profiled foot section extending away from a bottom wall of the basic body, and said respective resilient supporting arms, which extend away from opposite side walls of the basic body, wherein the foot section is profiled approximately in a T-shape and the foot section and the bottom wall situated above it form two opposite guide grooves with approximately U-shaped profiles, wherein the receiving device of the holding member comprises two spaced holding webs onto which the guide grooves of the end piece can be pushed, wherein each of said resilient supporting arms comprises a first arm section which projects beyond the basic body in the longitudinal direction and on which locally a molded-on detent nose is provided, and wherein the first arm section is connected in one piece with a second arm section, the supporting arms being swivelled into their release positions by pressing the second arm sections together.

4. Bowden cable for transmitting tensile forces comprising:

an exterior flexible Bowden cable casing, an interior pulling element guided in sections in the Bowden cable casing, at least one end of the Bowden cable casing being fastened to a receiving device of a stationary holding member in a longitudinal direction, an injection-molded-on end piece provided on the end of the Bowden cable casing and which can be pushed into the receiving device of the holding member which extends approximately parallel to the longitudinal direction of the Bowden cable casing, and at least one resilient supporting arm constructed on the end piece by which the end piece is fixed, in an axial direction, in the receiving device, wherein said at least one resilient supporting arm includes respective resilient supporting arms, wherein the end piece comprises an approximately prismatic basic body which surrounds the Bowden cable casing, a profiled foot section extending away from a bottom wall of the basic body, and said respective resilient supporting arms, which extend away from opposite side walls of the basic body, wherein the foot section is profiled approximately in a T-shape and the foot section and the bottom wall situated above it form two opposite guide grooves with approximately U-shaped profiles, wherein the receiving device of the holding member comprises two spaced holding webs onto which the guide grooves of the end piece can be pushed, wherein a recess is provided between the two spaced holding webs and an insertion opening is disposed in front of the holding webs viewed in the inserting direction, wherein each of said resilient supporting arms comprises a first arm section which projects beyond the basic body in the longitudinal direction and on which locally a molded-on detent nose is provided, and wherein the first arm section is connected in one piece with a second arm section, the supporting arms being swivelled into their release positions by pressing the second arm sections together.

* * * * *